United States Patent
Pearce et al.

(10) Patent No.: US 9,603,461 B2
(45) Date of Patent: Mar. 28, 2017

(54) BREATHABLE GEL

(75) Inventors: Tony M. Pearce, Alpine, UT (US); Russel Whatcott, Eagle Mountain, UT (US); LaVon Lee Bennett, Alpine, UT (US)

(73) Assignee: EDIZONE, LLC, Alpine, UT (US)

( * ) Notice: Subject to any disclaimer, the term of this patent is extended or adjusted under 35 U.S.C. 154(b) by 311 days.

(21) Appl. No.: 13/420,999

(22) Filed: Mar. 15, 2012

(65) Prior Publication Data

US 2012/0244312 A1  Sep. 27, 2012
US 2015/0335166 A9  Nov. 26, 2015

Related U.S. Application Data

(63) Continuation-in-part of application No. 12/784,247, filed on May 20, 2010, now Pat. No. 8,932,692, and (Continued)

(51) Int. Cl.
*B32B 3/10* (2006.01)
*B32B 3/30* (2006.01)
(Continued)

(52) U.S. Cl.
CPC .............. *A47C 27/10* (2013.01); *A47C 27/15* (2013.01); *A47C 27/20* (2013.01); *A47C 31/116* (2013.01);
(Continued)

(58) Field of Classification Search
None
See application file for complete search history.

(56) References Cited

U.S. PATENT DOCUMENTS 2,344,762 A * 3/1944 Wylie .................. A43B 7/06
  36/3 B
2,458,588 A  1/1949 Roy et al.
(Continued)

FOREIGN PATENT DOCUMENTS

CN  201211015 Y  *  3/2009
CN  201624384 U  *  11/2010
(Continued)

OTHER PUBLICATIONS

Machine Translation of JP 11113689 A, Apr. 1999.*
Machine Translation of JP 2002315656 A, Oct. 2002.*
U.S. Appl. No. 12/287,047, filed Sep. 2010.*

*Primary Examiner* — Jeff Vonch
(74) *Attorney, Agent, or Firm* — TraskBritt

(57) ABSTRACT

Cushioning elements include a breathable material configured to allow gases to pass through at least a portion thereof, and a plurality of discrete segments of thermoplastic elastomeric gel ("gel") heat-fused or otherwise attached to the breathable material. The gel comprises an elastomeric polymer and a plasticizer, with a plasticizer-to-polymer ratio of from about 0.3 to about 50. The plurality of discrete segments defines at least one breathable gap between adjacent discrete segments. Methods of forming cushioning elements include forming a plurality of discrete segments of gel, securing each segment to a breathable material, and providing a gas path through the breathable material and between adjacent segments. Another method includes providing molten gel within a mold, providing at least a second portion of the gel within a permeable material, and solidifying the gel to form discrete segments of gel.

17 Claims, 6 Drawing Sheets

Related U.S. Application Data a continuation-in-part of application No. 12/287,047, filed on Oct. 3, 2008, now Pat. No. 8,434,748.

(60) Provisional application No. 61/465,911, filed on Mar. 25, 2011, provisional application No. 61/216,787, filed on May 21, 2009.

(51) Int. Cl.

| | | |
|---|---|---|
| *A47C 27/10* | (2006.01) | |
| *B68G 5/00* | (2006.01) | |
| *A47C 31/11* | (2006.01) | |
| *D06N 7/00* | (2006.01) | |
| *D06N 3/10* | (2006.01) | |
| *A47C 27/15* | (2006.01) | |
| *A47C 27/20* | (2006.01) | |
| *B32B 3/22* | (2006.01) | |
| *A47C 27/00* | (2006.01) | |
| *B32B 3/16* | (2006.01) | |
| *B32B 3/26* | (2006.01) | |
| *B29L 31/00* | (2006.01) | |
| *B29L 31/58* | (2006.01) | |
| *B29C 65/48* | (2006.01) | |
| *B29C 65/00* | (2006.01) | |
| *B29C 65/02* | (2006.01) | |

(52) U.S. Cl.
CPC .............. *B68G 5/00* (2013.01); *D06N 3/106* (2013.01); *D06N 7/0092* (2013.01); *A47C 27/00* (2013.01); *B29C 65/02* (2013.01); *B29C 65/48* (2013.01); *B29C 66/30325* (2013.01); *B29C 66/30326* (2013.01); *B29C 66/472* (2013.01); *B29C 66/71* (2013.01); *B29C 66/727* (2013.01); *B29C 66/729* (2013.01); *B29C 66/7392* (2013.01); *B29C 66/73181* (2013.01); *B29L 2031/58* (2013.01); *B29L 2031/7138* (2013.01); *B29L 2031/751* (2013.01); *B32B 3/16* (2013.01); *B32B 3/22* (2013.01); *B32B 3/266* (2013.01); *D06N 2201/042* (2013.01); *D06N 2203/042* (2013.01); *D06N 2209/123* (2013.01); *D06N 2211/14* (2013.01); *Y10T 428/2481* (2015.01); *Y10T 428/24273* (2015.01); *Y10T 428/24314* (2015.01); *Y10T 428/24322* (2015.01); *Y10T 428/24331* (2015.01); *Y10T 428/24802* (2015.01)

(56) References Cited

U.S. PATENT DOCUMENTS

| | | | |
|---|---|---|---|
| 2,617,751 A | 11/1952 | Bickett | |
| 2,655,369 A | 10/1953 | Musilli | |
| 2,751,609 A * | 6/1956 | Oesterling et al. | ................ 5/420 |
| 2,901,028 A * | 8/1959 | Bottemiller | .......... A47C 31/023 |
| | | | 297/411.44 |
| 3,197,357 A | 7/1965 | Schulpen | |
| 3,285,768 A * | 11/1966 | Habib | ................ B26D 3/006 |
| | | | 428/160 |
| 3,679,263 A * | 7/1972 | Cadiou | .................. A47C 7/282 |
| | | | 297/452.48 |
| 4,369,284 A | 1/1983 | Chen et al. | |
| 4,538,301 A * | 9/1985 | Sawatzki | ............ A41D 13/0156 |
| | | | 2/411 |
| 4,989,284 A * | 2/1991 | Gamm | ................... A47C 7/021 |
| | | | 5/652.1 |
| 5,027,801 A * | 7/1991 | Grim | ..................... A61F 5/0111 |
| | | | 602/16 |
| 5,098,421 A * | 3/1992 | Zook | .............. 604/367 |
| 5,167,999 A * | 12/1992 | Wang | .................. A43B 7/1425 |
| | | | 36/30 R |
| 5,172,494 A | 12/1992 | Davidson | |
| 5,243,722 A | 9/1993 | Gusakov | |
| 5,262,468 A | 11/1993 | Chen et al. | |
| 5,302,440 A * | 4/1994 | Davis | ....................... B05D 7/12 |
| | | | 428/195.1 |
| 5,334,646 A | 8/1994 | Chen | |
| 5,336,708 A | 8/1994 | Chen | |
| 5,362,834 A | 11/1994 | Schapel et al. | |
| 5,421,874 A | 6/1995 | Pearce | |
| 5,508,334 A | 4/1996 | Chen | |
| 5,549,743 A | 8/1996 | Pearce | |
| 5,551,173 A * | 9/1996 | Chambers | ............... A43B 7/146 |
| | | | 36/141 |
| 5,592,706 A | 1/1997 | Pearce | |
| 5,626,657 A | 5/1997 | Pearce | |
| 5,633,286 A | 5/1997 | Chen | |
| 5,636,395 A * | 6/1997 | Serda | .................... A47C 27/085 |
| | | | 5/655.5 |
| 5,749,111 A | 5/1998 | Pearce | |
| 5,881,409 A | 3/1999 | Pearce et al. | |
| 5,994,450 A | 11/1999 | Pearce et al. | |
| 6,026,527 A | 2/2000 | Pearce et al. | |
| 6,059,669 A | 5/2000 | Pearce | |
| 6,187,837 B1 | 2/2001 | Pearce | |
| 6,413,458 B1 | 7/2002 | Pearce | |
| 6,498,198 B2 | 12/2002 | Pearce | |
| 6,677,026 B1 * | 1/2004 | Yates | .................... A47C 27/085 |
| | | | 297/452.41 |
| 6,743,325 B1 * | 6/2004 | Taylor | ................. A41D 13/0156 |
| | | | 156/259 |
| 6,797,765 B2 | 9/2004 | Pearce | |
| 6,835,015 B2 | 12/2004 | Pearce | |
| 6,842,926 B2 | 1/2005 | Kuo | |
| 6,865,759 B2 * | 3/2005 | Pearce | ........................... 5/655.5 |
| 6,890,883 B2 | 5/2005 | Pearce | |
| 6,905,431 B2 | 6/2005 | Pearce et al. | |
| 6,908,662 B2 | 6/2005 | Pearce | |
| 6,943,198 B2 | 9/2005 | Pearce | |
| 7,000,966 B2 | 2/2006 | Kramarczyk et al. | |
| 7,060,213 B2 | 6/2006 | Pearce | |
| 7,076,822 B2 | 7/2006 | Pearce | |
| 7,101,247 B2 | 9/2006 | Pearce | |
| 7,138,079 B2 | 11/2006 | Pearce | |
| 7,625,458 B2 * | 12/2009 | Lin | ....................... B29C 43/021 |
| | | | 156/219 |
| 7,666,341 B2 | 2/2010 | Pearce | |
| 7,730,566 B2 | 6/2010 | Flick et al. | |
| 7,964,664 B2 | 6/2011 | Pearce | |
| 8,075,981 B2 | 12/2011 | Pearce et al. | |
| 8,424,137 B1 | 4/2013 | Pearce et al. | |
| 8,434,748 B1 | 5/2013 | Pearce et al. | |
| 8,628,067 B2 | 1/2014 | Pearce et al. | |
| 8,932,692 B2 | 1/2015 | Pearce | |
| 2002/0013407 A1 | 1/2002 | Pearce | |
| 2003/0224090 A1 | 12/2003 | Pearce et al. | |
| 2003/0232177 A1 | 12/2003 | Pearce | |
| 2003/0234462 A1 | 12/2003 | Pearce | |
| 2004/0200003 A1 * | 10/2004 | Kuo | ................... 5/654 |
| 2004/0247649 A1 | 12/2004 | Pearce et al. | |
| 2004/0247744 A1 | 12/2004 | Pearce et al. | |
| 2004/0247746 A1 | 12/2004 | Pearce et al. | |
| 2005/0003048 A1 | 1/2005 | Pearce et al. | |
| 2005/0013902 A1 | 1/2005 | Pearce | |
| 2005/0074525 A1 | 4/2005 | Pearce | |
| 2005/0074526 A1 | 4/2005 | Pearce | |
| 2005/0100639 A1 | 5/2005 | Pearce | |
| 2005/0100647 A1 | 5/2005 | Pearce | |
| 2005/0100648 A1 | 5/2005 | Pearce | |
| 2005/0100651 A1 | 5/2005 | Pearce | |
| 2006/0194925 A1 | 8/2006 | Pearce | |
| 2007/0021706 A1 * | 1/2007 | Braunstein | ............ A61F 5/0109 |
| | | | 602/63 |
| 2007/0050905 A1 * | 3/2007 | Fowkes | .................... A47K 3/12 |
| | | | 4/579 |
| 2007/0061978 A1 * | 3/2007 | Losio | ..................... A47C 21/046 |
| | | | 5/655.5 |

(56) References Cited

U.S. PATENT DOCUMENTS

| | | | | |
|---|---|---|---|---|
| 2007/0226911 | A1* | 10/2007 | Gladney | A47C 27/148 5/691 |
| 2007/0246157 | A1* | 10/2007 | Mason | A47C 27/085 156/242 |
| 2008/0095983 | A1* | 4/2008 | Callsen | A47C 27/085 428/141 |
| 2008/0229507 | A1* | 9/2008 | Healy | A47C 27/15 5/691 |
| 2008/0244832 | A1* | 10/2008 | Kuo | 5/638 |
| 2009/0126107 | A1* | 5/2009 | Kuo | 5/400 |
| 2009/0246449 | A1* | 10/2009 | Jusiak | A61G 7/05738 428/99 |
| 2010/0072676 | A1* | 3/2010 | Gladney | A47C 27/148 264/510 |
| 2010/0223730 | A1 | 9/2010 | Pearce et al. | |
| 2010/0227091 | A1 | 9/2010 | Pearce | |
| 2010/0229308 | A1 | 9/2010 | Pearce et al. | |
| 2010/0237082 | A1* | 9/2010 | Fernandez | A47C 7/021 220/592.17 |
| 2011/0189444 | A1* | 8/2011 | Beers | A41D 13/05 428/192 |
| 2011/0252568 | A1* | 10/2011 | Ramp | A47C 20/027 5/655.3 |
| 2012/0015151 | A1 | 1/2012 | Pearce et al. | |
| 2012/0031800 | A1 | 2/2012 | Nilson et al. | |
| 2012/0052769 | A1 | 3/2012 | Pearce et al. | |
| 2012/0079661 | A1* | 4/2012 | Chen | A63B 21/4037 5/655.5 |
| 2012/0117733 | A1* | 5/2012 | Chen | A47G 9/1009 5/652.1 |
| 2013/0000045 | A1* | 1/2013 | Losio | A47C 21/046 5/655.3 |
| 2013/0205509 | A1* | 8/2013 | Chen | A47C 27/146 5/731 |
| 2014/0096324 | A1* | 4/2014 | LaFlamme | A47C 27/15 5/691 |

FOREIGN PATENT DOCUMENTS

| | | | | |
|---|---|---|---|---|
| CN | 201782434 U | * | 4/2011 | |
| EP | 2080780 A2 | * | 7/2009 | C08L 53/02 |
| JP | 04221529 A | * | 8/1992 | |
| JP | 11113689 A | * | 4/1999 | A47C 27/15 |
| JP | 2002315656 A | * | 10/2002 | A47C 27/15 |
| JP | 2005052181 A | * | 3/2005 | |
| JP | 2007217846 A | * | 8/2007 | |
| KR | 200315625 Y1 | | 6/2003 | |
| WO | 8810339 A1 | | 12/1988 | |
| WO | WO 2010015887 A1 | * | 2/2010 | A47C 27/146 |

* cited by examiner

BREATHABLE GEL

CROSS-REFERENCE TO RELATED APPLICATION

This application claims the benefit of U.S. Provisional Patent Application Ser. No. 61/465,911, filed Mar. 25, 2011, and titled "Breathable Gel for Cushioning and/or Temperature Management," the disclosure of which is incorporated herein by reference in its entirety. This application is a continuation-in-part of U.S. patent application Ser. No. 12/784,247, filed May 20, 2010, and titled "Cushions Comprising Deformable Members and Related Methods," now U.S. Pat. No. 8,932,962, issued Jan. 13, 2015, which claims the benefit of U.S. Provisional Patent Application Ser. No. 61/216,787, filed May 21, 2009, and titled "Cushions with Individually Pocketed Non-Linear Members, Gel Springs with Joiner Ribs, Gel Cores," and which is also a continuation-in-part of U.S. patent application Ser. No. 12/287,047, filed Oct. 3, 2008, and titled "Gel Springs," now U.S. Pat. No. 8,434,748, issued May 7, 2013.

FIELD

Embodiments of the disclosure relate generally to cushioning elements comprising a gel component, to products including such cushioning elements, and to methods of making and using such cushioning elements.

BACKGROUND

Cushioning materials have a variety of uses, such as for mattresses, seating surfaces, shoe inserts, packaging, medical devices, etc. Cushioning materials may be formulated and/or configured to reduce peak pressure on a cushioned body, which may increase comfort for humans or animals, and may protect objects from damage. Cushioning materials may be formed of materials that deflect or deform under load, such as polyethylene or polyurethane foams (e.g., convoluted foam), vinyl, rubber, springs, natural or synthetic fibers, fluid-filled flexible containers, etc. Different cushioning materials may have different responses to a given pressure, and some materials may be well suited to different applications. Cushioning materials may be used in combination with one another to achieve selected properties.

For example, cushioning materials may include a foam layer topped with a layer of thermoset elastomeric gel, such as a polyurethane gel or a silicone gel. Because polyurethane gels and silicone gels are generally structurally weak and/or sticky, cushioning materials may include film covering such gels, such as a thin thermoplastic polyurethane film. The film may reinforce the strength of the gel, and may prevent other materials from sticking to the gel, since the film generally adheres to the gel but is not itself sticky.

Gels may be used for cushioning and/or temperature management. Gels may provide cushioning because the gels may hydrostatically flow to the shape of a cushioned object and may tend to relieve pressure peaks and/or reduce stresses from shear. Gels may have high thermal mass and/or thermal conductivity, and may therefore be used for heating (such as in hot packs for sore muscles), cooling (such as in cold packs for sprains or for a feeling of coolness when lying on a mattress), or maintaining a given temperature (such as in a mattress being used in a too-warm or too-cool room). For example, gel may be fused to the top of a mattress core, and a film may cover the gel. As another example, gels may be used as the top layer of a foam wheelchair cushion.

A conventional gel layer, with or without a plastic film, may be a barrier to gases (e.g., air, vapors, or other gases). This barrier may cause difficulties such as discomfort, such as when body heat and/or perspiration accumulate between the user's body and the gel layer. Even when a breathable material (such as a foam cover or batting fiber) is disposed between a cushioned object and the gel, gases can only travel laterally through the breathable material. Since gases cannot penetrate the plastic film or the gel, the plastic film or the gel inhibits the flow of the gases away from the cushioned object. When the weight of the cushioned object compresses the breathable material, the lateral gas flow paths may become more constricted. Thus, it would be beneficial to provide a cushioning material that alleviates some of these concerns.

BRIEF SUMMARY

In some embodiments, the present disclosure includes a cushioning element comprising a breathable material configured to allow gases to pass through at least a portion thereof, and a plurality of discrete segments of thermoplastic elastomeric gel heat-fused to the breathable material. The thermoplastic elastomeric gel comprises an elastomeric polymer and a plasticizer. A ratio of a weight of the plasticizer to a weight of the elastomeric polymer is from about 0.3 to about 50. The plurality of discrete segments defines at least one breathable gap between adjacent discrete segments.

A method of forming a cushioning element comprises forming a plurality of discrete segments of thermoplastic elastomeric gel, securing each discrete segment of thermoplastic elastomeric gel to a breathable material configured to allow gases to pass through at least a portion thereof, and providing a gas path through the breathable material and between adjacent discrete segments of thermoplastic elastomeric gel. The thermoplastic elastomeric gel comprises an elastomeric polymer and a plasticizer. A ratio of a weight of the plasticizer to a weight of the elastomeric polymer is from about 0.3 to about 50.

Another method of forming a cushioning element comprises disposing a permeable material adjacent a mold, providing at least a first portion of a molten thermoplastic elastomeric gel within the mold, providing at least a second portion of the molten thermoplastic elastomeric gel within the permeable material, solidifying the molten thermoplastic elastomeric gel to form discrete segments of thermoplastic elastomeric gel, and separating the mold from at least a portion of the permeable material. The thermoplastic elastomeric gel comprises an elastomeric polymer and a plasticizer. A ratio of a weight of the plasticizer to a weight of the elastomeric polymer is from about 0.3 to about 50.

Another cushioning element comprises a breathable material configured to allow gases to pass through at least a portion thereof and a plurality of discrete segments of thermoplastic elastomeric gel attached to the breathable material. The plurality of discrete segments is heat-fused to the breathable material. The plurality of discrete segments and the breathable material together define at least a portion of at least one void. The thermoplastic elastomeric gel comprises an elastomeric polymer and a plasticizer, and a ratio of a weight of the plasticizer to a weight of the elastomeric polymer is from about 0.3 to about 50.

BRIEF DESCRIPTION OF THE DRAWINGS

While the specification concludes with claims particularly pointing out and distinctly claiming that which are regarded as embodiments of the present disclosure, various features and advantages may be more readily ascertained from the following description of example embodiments of the disclosure provided with reference to the accompanying drawings, in which:

DETAILED DESCRIPTION

Figure 1A:
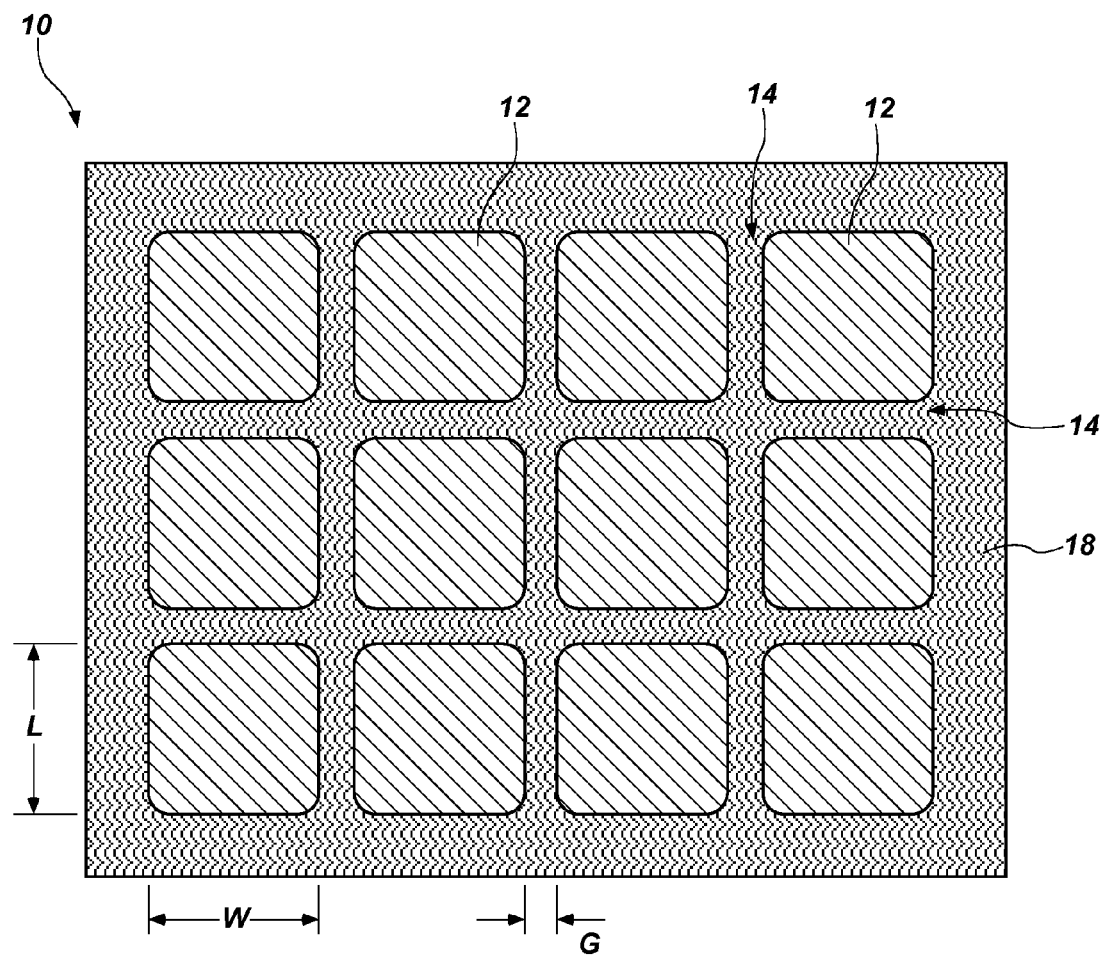
FIG. 1A is a simplified top view of a cushioning element, showing generally square gel segments, a breathable material, and a breathable gap among the segments of gel.

As used herein, the term "cushioning element" means and includes any deformable device intended for use in cushioning one body relative to another. As a non-limiting example, cushioning elements include materials intended for use in cushioning the body of a person relative to another object that might otherwise abut against the body of the person, such as a seat cushion.

As used herein, the term "breathable" means configured to allow gases (e.g., air and vapors, such as water vapor) to pass through. A breathable material may be a fabric, a foam, or another material having gas passageways.

As used herein, the term "elastomeric polymer" means and includes a polymer capable of recovering its original size and shape after deformation. In other words, an elastomeric polymer is a polymer having elastic properties. Elastomeric polymers may also be referred to as "elastomers" in the art. Elastomeric polymers include, without limitation, homopolymers (polymers having a single chemical unit repeated) and copolymers (polymers having two or more chemical units).

As used herein, the term "elastomeric block copolymer" means and includes an elastomeric polymer having groups or blocks of homopolymers linked together, such as A-B diblock copolymers and A-B-A triblock copolymers. A-B diblock copolymers have two distinct blocks of homopolymers. A-B-A triblock copolymers have two blocks of a single homopolymer (A) each linked to a single block of a different homopolymer (B).

As used herein, the term "plasticizer" means and includes a substance added to another material (e.g., an elastomeric polymer) to increase a workability of the material. For example, a plasticizer may increase the flexibility or softness of the material. Plasticizers include hydrocarbon fluids, such as mineral oils. Hydrocarbon plasticizers may be aromatic or aliphatic.

As used herein, the term "TPE gel" means and includes a thermoplastic elastomeric gel having an elastomeric polymer (e.g., a homopolymer or a copolymer) and a plasticizer. TPE gels are thermoplastic (i.e., melting when heated and solidifying when cooled) and elastic (i.e., capable of recovering size and shape after deformation). TPE gels may be referred to in the art as "thermoplastic gels," "thermoplastic elastomeric gels," "elastomer gels," "gelatinous elastomers," or simply "gels."

The illustrations presented herein are not actual views of any particular material or device, but are merely idealized representations employed to describe embodiments of the present disclosure. Elements common between figures may retain the same numerical designation.

Cushioning elements having breathable gaps or voids are disclosed herein. Such gaps or voids may allow gas flow through and/or around portions of the cushioning elements. The cushioning elements may be free of a continuous barrier impermeable to gases. The cushioning elements may have temperature management features. The cushioning elements may include discrete TPE gel segments that have a generally coplanar or otherwise cooperatively shaped top surface and have spaces between and/or within the gel segments.

FIGS. 1A through 3D show cushioning elements 10, 20, and 30, each having a plurality of discrete gel segments 12. Surfaces of the gel segments 12 define at least one breathable gap 14. The breathable gap 14 may be configured to allow gases, such as air, water vapor, etc., to pass between adjacent gel segments 12.

Gel segments 12 may be formed of TPE gel. TPE gels are described in, for example, U.S. Pat. No. 5,749,111, issued May 12, 1998, and entitled "Gelatinous Cushions with Buckling Columns;" U.S. Pat. No. 6,026,527, issued Feb. 22, 2000, and entitled "Gelatinous Cushions with Buckling Columns;" U.S. Pat. No. 5,994,450, issued Nov. 30, 1999, and entitled "Gelatinous Elastomer and Methods of Making and Using the Same and Articles Made Therefrom;" and U.S. Pat. No. 6,797,765, issued Sep. 28, 2004, and entitled "Gelatinous Elastomer;" the disclosures of each of which are incorporated herein in their entirety by this reference.

TPE gels may comprise A-B-A triblock copolymers such as styrene ethylene propylene styrene (SEPS), styrene ethylene butylene styrene (SEBS), and styrene ethylene ethylene propylene styrene (SEEPS). For example, A-B-A triblock copolymers are currently commercially available from Kuraray America, Inc., of Houston, Tex., under the trade name SEPTON® 2002, and from Kraton Polymers, LLC, of Houston, Tex., under the trade names KRATON® G1643M and KRATON® MD6945M. In these examples, the "A" blocks are styrene. The "B" block may be rubber (e.g., butadiene, isoprene. etc.) or hydrogenated rubber (e.g., ethylene/propylene or ethylene/butylene or ethylene/ethylene/propylene) that may be plasticized with mineral oil or other hydrocarbon fluids. TPE gels may comprise elastomeric polymers other than styrene-based copolymers, such as elastomeric polymers that are thermoplastic in nature or that can be solvated by plasticizers.

TPE gels may comprise one or more plasticizers, such as hydrocarbon fluids. For example, TPE gels may comprise aromatic-free food-grade white paraffinic mineral oils, such as those sold by Sonneborn, Inc., of Mahwah, N.J., under the trade names BLANDOL® and CARNATION®.

In some embodiments, TPE gels may have plasticizer-to-polymer ratios from about 0.3-to-1 to about 50-to-1 by weight. For example, TPE gels may have plasticizer-to-polymer ratios from about 2-to-1 to about 30-to-1 by weight, or even from about 5-to-1 to about 15-to-1 by weight. In further embodiments, TPE gels may have plasticizer-to-polymer ratios of about 8-to-1 by weight.

TPE gels may also include antioxidants. Antioxidants may reduce the effects of thermal degradation during processing or may improve long-term stability. Antioxidants include, for example, pentaerythritol tetrakis(3-(3,5-di-tert-butyl-4-hydroxyphenyl)propionate), commercially available as IRGANOX® 1010, from BASF Corp., of Iselin, N.J. or as EVERNOX®-10, from Everspring Chemical, of Taichung, Taiwan; octadecyl-3-(3,5-di-tert-butyl-4-hydroxyphenyl)propionate, commercially available as IRGANOX® 1076, from BASF Corp. or as EVERNOX® 76, from Everspring Chemical; and tris(2,4-di-tert-butylphenyl)phosphite, commercially available as IRGAFOS® 168, from BASF Corp. or as EVERFOS® 168, from Everspring Chemical. One or more antioxidants may be combined in a single TPE gel formulation. The use of antioxidants in mixtures of plasticizers and polymers is described in columns 25-26 of U.S. Pat. No. 5,994,450, previously incorporated by reference. TPE gel formulations may comprise up to about 5 wt % antioxidants. For instance, a TPE gel may comprise about 0.10 wt % to about 1.0% antioxidants.

TPE gels may be formulated to be used without an impermeable barrier (e.g., a plastic sheet). For example, TPE gels may be formulated to be strong enough to not break under normal use, even without the reinforcement that a plastic sheet provides to conventional cushioning materials. Furthermore, TPE gels that have lower stickiness than conventional gel cushioning materials may not require a barrier to cover sticky surfaces of gel structures. The lack of an impermeable barrier may allow gases to travel more freely through the cushioning element 10, 20, via breathable gaps 14. Freely circulating gases may provide relief from moisture, corrosive gases, perspiration, body heat, etc. Not only does the elimination of impermeable barriers aid in allowing breathability, it may also reduce materials and manufacturing costs.

Gel segments 12 may include a TPE gel that returns to its original shape after deformation, and that may be elastically stretched to many times its original size. Gel segments 12 may be rubbery in feel, but may deform to the shape of an object applying a deforming pressure better than conventional rubber materials, and may have a durometer hardness lower than conventional rubber materials. For example, gel segments 12 may have a hardness on the Shore A scale of less than about 50, from about 0.3 to about 50, or less than about 1. TPE gels, which are thermoplastic in nature, may be stronger, for example, five to ten times stronger in tensile strength or yield strength, than conventional thermoset cushioning gels such as polyurethane and silicone gels.

TPE gels may be less sticky than conventional thermoset cushioning gels. TPE gels may not generally be adhesively sticky, but instead may be mildly tacky. The composition of the gel segments 12 may have a selected stickiness or tackiness. For example, the gel segments 12 may have a lower stickiness than gel used in conventional cushioning elements. For some applications, stickiness may be beneficial, and more sticky formulations of TPE gels may be used. Elimination of the plastic film in such embodiments may allow stickiness to be exposed so that it may function in a sticky manner as desired. In other embodiments, low tackiness and high tensile strength (e.g., from about 1.4 MPa (200 psi) to about 14 MPa (2,000 psi)) may eliminate the need for impermeable plastic films or sheets that are used in some conventional cushioning elements to provide strength to gel structures and nonadhesiveness to exposed surfaces.

TPE gel formulations may have selected thermal properties. Solid TPE gel may have higher heat capacity and higher thermal conductivity than foams, other cushioning materials, and/or other temperature management materials. Heating, cooling, and other temperature management may be a beneficial feature of cushioning elements 10, 20, 30 including gel segments 12. Strong TPE gel formulations having selected tackiness or stickiness may include elastomeric gels having lightweight (e.g., lightweight microspheres) and elastomeric gels without fillers. Fillers may affect thermal properties. For example, hollow microspheres may decrease the thermal conductivity by acting as an insulator because such hollow microspheres (e.g., hollow glass microspheres or hollow acrylic microspheres) may have lower thermal conductivity than the bulk TPE gel. As another example, metal particles (e.g., aluminum, copper, etc.) may increase the thermal conductivity of the resulting material because such particles may have greater thermal conductivity than the bulk TPE gel. As another example, microspheres filled with wax or another phase-change material (i.e., a material formulated to undergo a phase change near a temperature at which a cushioning element may be used) may provide temperature stability at or near the phase-change temperature of the wax or other phase-change material within the microspheres (i.e., due to the heat of fusion of the phase change). A TPE gel including wax or another phase-change material as all or part of the plasticizer portion of the gel may have similar properties.

Figure 2A:
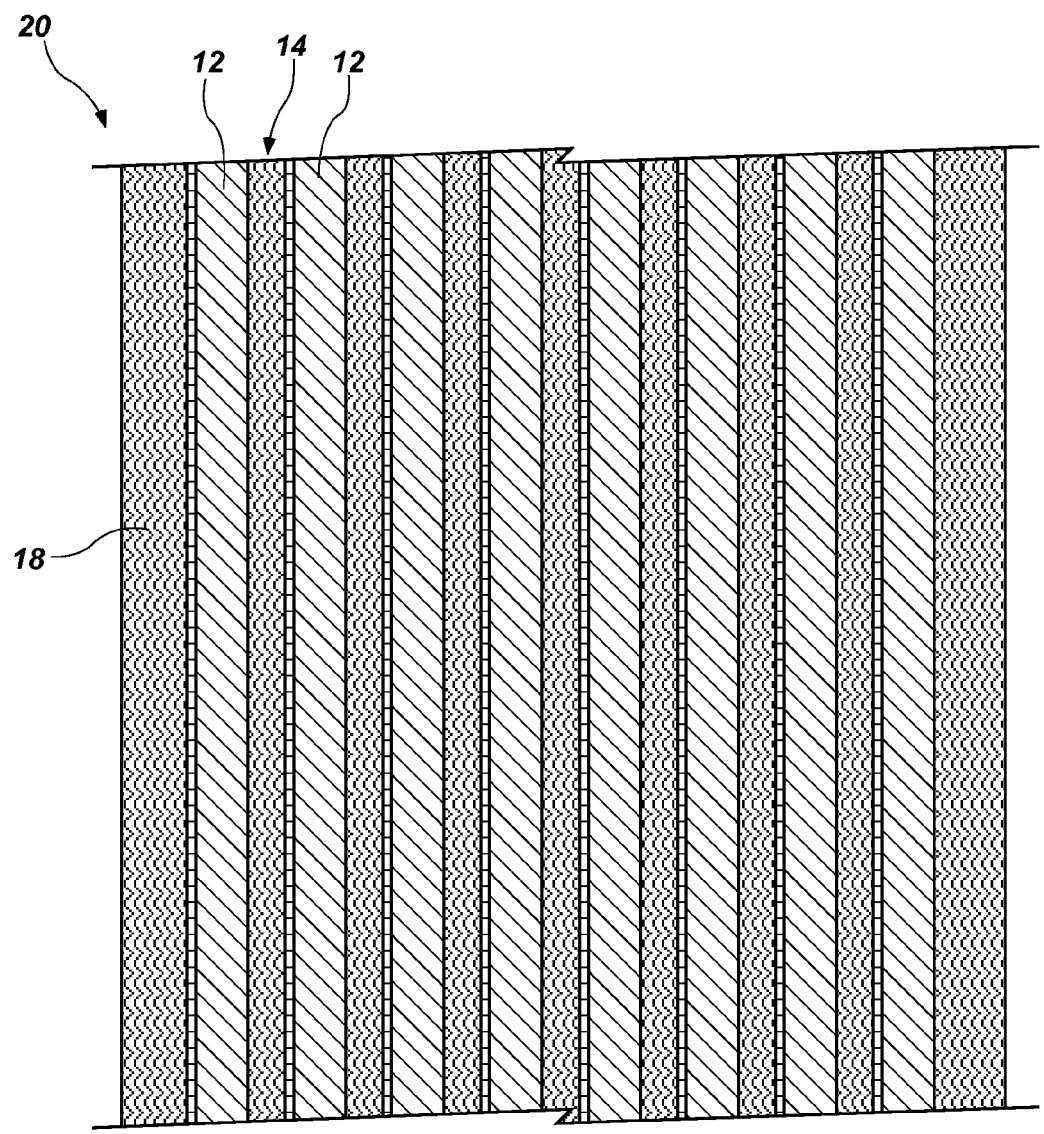
FIG. 2A is a simplified perspective view of another cushioning element, showing generally continuous rows or strips of gel, a breathable material, and breathable gaps between the TOWS.

Gel segments 12 may have any selected shape. As shown in FIG. 1A, gel segments 12 may have a generally square cross section in a plane parallel to a breathable material 18 over which the gel segments 12 are disposed. That is, a length L of a gel segment 12 may be approximately equal to a width W of the gel segment 12. Cross sections of gel segments 12 may have rounded corners. As shown in FIG. 2A, gel segments 12 may be continuous rows or strips of TPE gel. Such a configuration may be amenable to continuous production, as described in more detail below. Cross sections of gel segments 12 may have other shapes, for example, polygons (e.g., triangles, quadrilaterals, pentagons, hexagons, stars, etc.), circles, ovals, semicircles, crescents, irregular shapes, the shape of a company or team logo, etc.

Figure 3A:
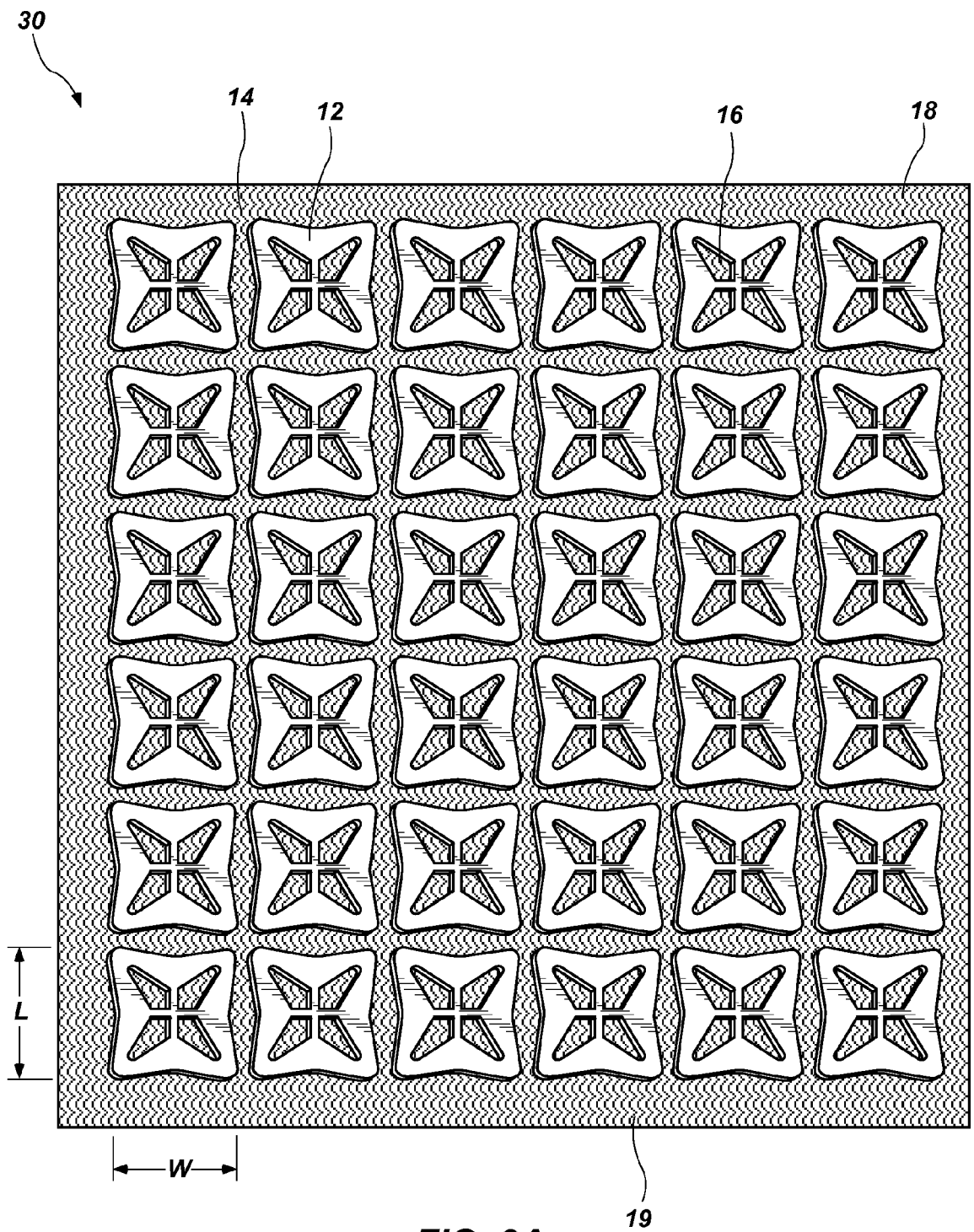
FIG. 3A is a simplified perspective view of another cushioning element, showing gel segments with gaps between adjacent segments and within each segment.
Figure 3B:
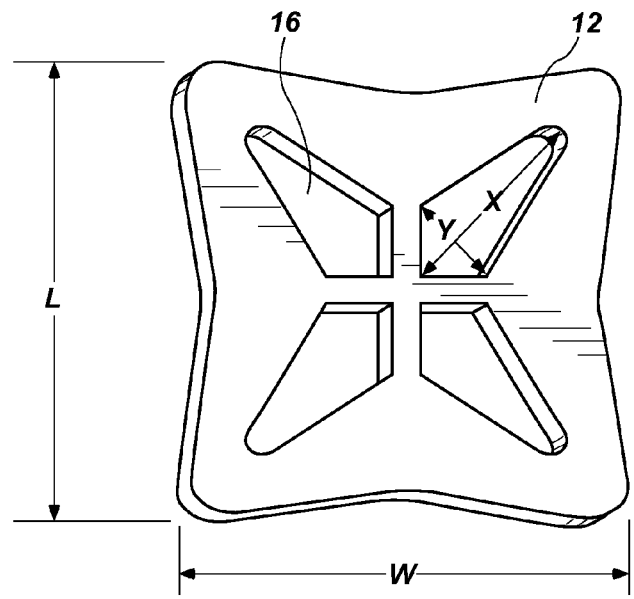
FIG. 3B is a simplified perspective view of a gel segment of the cushioning element of FIG. 3A.
Figure 3C:
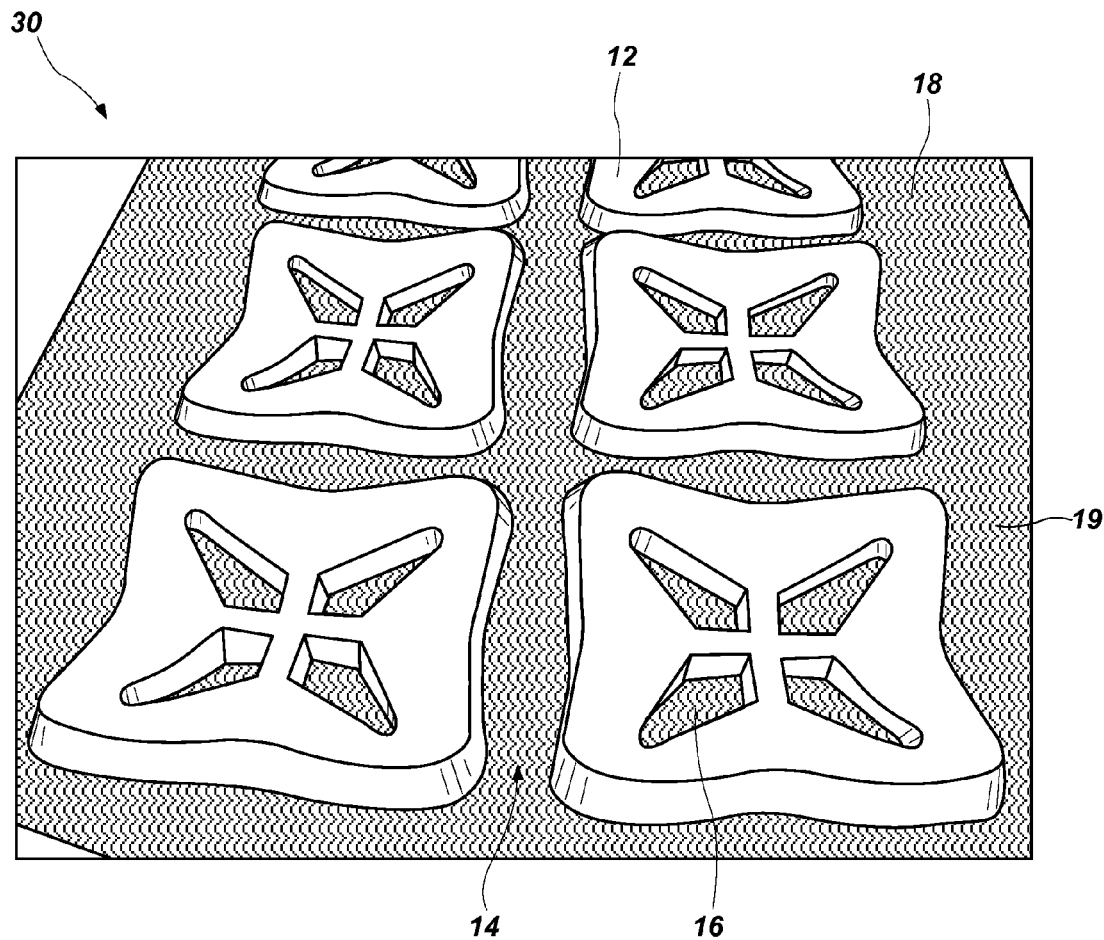
FIG. 3C is an additional simplified perspective view of the cushioning element of FIG. 3A.

As shown in FIGS. 3A through 3D, some gel segments 12 may define one or more internal gaps 16 within the gel segment 12. For example, in the cushioning element 30, each gel segment 12 defines four internal gaps 16. The internal gaps 16 shown in FIGS. 3A through 3D have a generally quadrilateral "arrowhead" shape, but internal gaps 16 may have any selected shape. For example, internal gaps 16 may have a cross section in a plane parallel to the breathable material 18 having a polygonal shape (triangle, quadrilateral, pentagon, etc.), a circular shape, an oval shape, an irregular shape, the shape of a company or team logo, etc. Polygonal cross sections of internal gaps 16 may be regular (i.e., all angles and sides of the polygon may be congruent) or irregular (e.g., as shown in FIG. 3A). Gel segments 12 having internal gaps 16 (e.g., as in cushioning elements 30) may have less material than similarly sized gel segments 12 without internal gaps 16 (e.g., as in cushioning elements 10). Thus, the cushioning element 30 may have a lower weight, a lower production cost, and/or a higher surface area available for bonding to other substrates than does the cushioning element 10 (e.g., the areas of the breathable material 18 where gel has permeated all the way through may not be bondable with adhesives, but the areas of the internal gaps 16 free of gel may be bondable with adhesives, as may the breathable gaps 14 around or adjacent to each gel segment 12). A wide variety of configurations and geometries of gel segments 12 may be used in addition to or in place of the illustrated configurations and geometries.

The gel segments 12 may be disposed over the breathable material 18, and may be secured directly or indirectly to the breathable material 18. The breathable material 18 may include one or more of fabric, foam, or another material. The breathable material 18 may be stretchable in one direction but non-stretchable in another direction. In some embodiments, the breathable material 18 may be stretchable in two or more directions, or may be non-stretchable in two or more directions. The breathable material 18 may be a woven fabric, a knit fabric, a mesh fabric, a three-dimensional fabric (i.e., a spacer fabric), a fabric laminated to a vapor-transmissible film (e.g., thin thermoplastic polyurethane), a porous foam having an open (i.e., connected) pore network, etc. A woven fabric may include any fabric having interlaced yarn, strands, or threads. A knit fabric may include any fabric having a series of connected loops of yarn or thread. A porous foam may be a natural or synthetic material having interconnecting pores. The breathable material 18 may be tricot, a material that may or may not have a texture on at least one side. For example, cotton tricot may have parallel woven ribs (or ridges) on one side, and the other side may be smooth. Alternatively, cotton tricot may have a first set of parallel woven ribs on one side and a second set of parallel woven ribs on the other side, oriented perpendicular to the first set of parallel woven ribs. The breathable material 18 may define a plurality of voids 19 extending through the breathable material 18. In some embodiments, the plurality of voids 19 may have an average dimension (e.g., an average diameter, an average width, etc.) of at least about 0.01 mm (about 0.0004 in), at least about 0.1 mm (about 0.004 in), at least about 1.0 mm (about 0.04 in), or at least about 10 mm (about 0.4 in). The breathable material 18 may also define a smaller plurality of voids (not shown) that may or may not extend through the breathable material 18. In other embodiments, all of the voids may be smaller. The breathable material 18 may be flexible and pliable to conform to the shape of other objects.

The breathable material 18 may be permeable by molten TPE gel and gases. The breathable material 18 may define voids or cavities, such as interconnected pores, spaces between fibers or threads, etc. Gases may pass through the voids or cavities, allowing the material to "breathe." The gel segments 12 may be heat-fused to the breathable material 18. In other words, the breathable material 18 may be impregnated by each of the gel segments 12. In some embodiments, a portion of each of the gel segments 12 may permeate the breathable material 18, such as in voids or cavities therein. The portion of gel segments 12 permeating the breathable material 18 may provide a force to maintain the gel segments 12 and the breathable gap 14 in place. In other embodiments, an adhesive may be disposed between the gel segments 12 and the breathable material 18. The breathable material 18 may at least partially constrain the gel segments 12 into a selected arrangement, a function that may be performed in conventional cushioning elements by an impermeable film. Thus, a cushioning element 10, 20, or 30 having a breathable material 18 may be free of a continuous barrier impermeable to gas. Without a continuous impermeable barrier, gases may freely pass through the cushioning element 10, 20, or 30, in both lateral and transverse directions (i.e., both parallel and perpendicular to the breathable material 18).

Figure 1B:
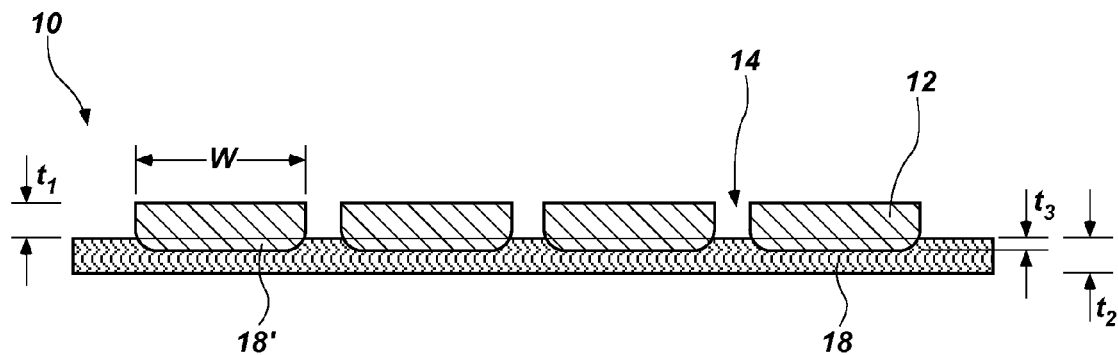
FIG. 1B is a simplified cross-sectional view of the cushioning element of FIG. 1A.
Figure 2B:
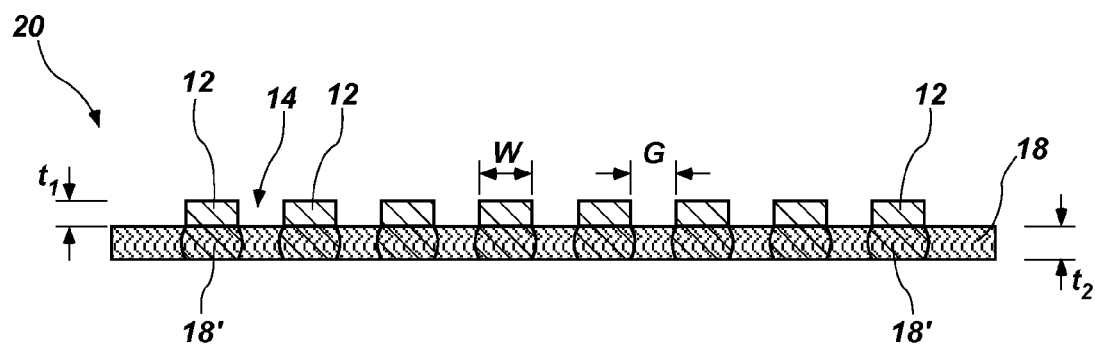
FIG. 2B is a simplified cross-sectional view of the cushioning element shown in FIG. 2A.

FIGS. 1B and 2B show cross-sections of the cushioning elements 10 and 20 shown in FIGS. 1A and 2A, respectively, and illustrate how the gel segments 12 may be secured to the breathable material 18. A portion of TPE gel may permeate sections 18' of the breathable material 18. The sections 18' may have similar cross-sectional shapes to the cross-sectional shapes of the gel segments 12. In some embodiments, the sections 18' may flare outward or inward from the gel segments 12, such that the sections 18' are wider or narrower at their tops (in the view of FIG. 2B) than at their bottoms. In some embodiments, the sections 18' may have approximately vertically constant cross sections. The sections 18' may have a thickness $t_3$ less than a thickness $t_2$ of the breathable material 18, as shown in FIG. 1B. In some embodiments, the sections 18' may have a thickness equal to a thickness $t_2$ of the breathable material 18, as shown in FIG. 2B. The sections 18' may include a portion of the breathable material 18 having TPE gel disposed within at least some voids or cavities. TPE gel within the voids or cavities may inhibit the transfer of gases through the sections 18'. In some embodiments, the sections 18' may be impermeable to gases. Nevertheless, gases may still pass through other portions of the breathable material 18.

Figure 3D:
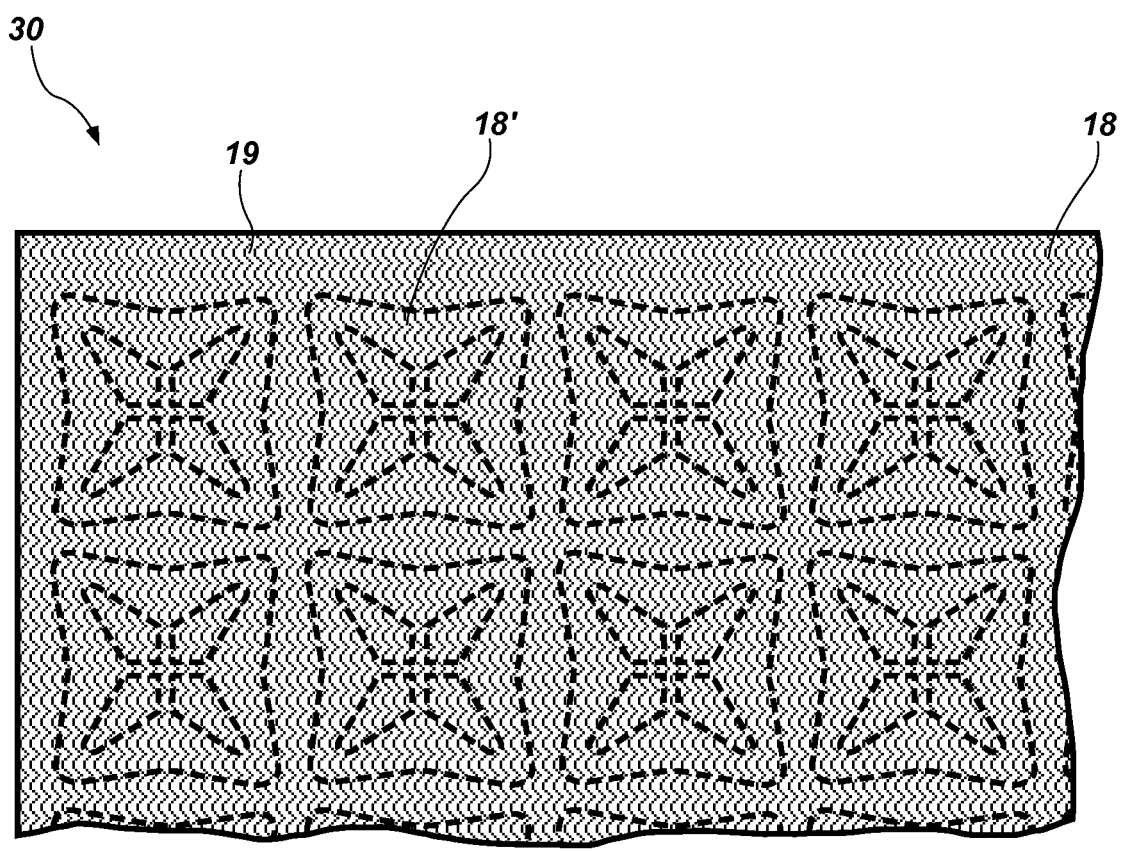
FIG. 3D is a simplified bottom view of the cushioning element of FIG. 3A.

FIG. 3D shows the bottom or obverse side of the cushioning element 30 of FIG. 3A. TPE gel may penetrate through sections 18' of the breathable material 18. The breathable material 18 may therefore have at least some TPE gel on both sides thereof. In other words, the section 18' may be embedded within the gel segments 12.

Dimensions and placement of the gel segments 12 may be selected such that the breathable gap 14 has dimensions that allow gas to flow between the gel segments 12 and provide support for a cushioned object. For example, the square cross section of the gel segments 12 shown in FIG. 1A may have a length L and a width W (i.e., dimensions in directions generally parallel to a surface of the breathable material 18) of from about 2.5 mm (about 0.1 in) to about 127 mm (about 5 in), such as from about 13 mm (about 0.5 in) to about 51 mm (about 2 in). In some embodiments, the square cross section of the gel segments 12 shown in FIG. 1A may have a length L and a width W of about 25.4 mm (about 1 in). The gel segments 12 shown in FIG. 3A may have lengths and widths (as measured at the widest points of the gel segments 12) within similar ranges. The gel segments 12 shown in FIG. 2A may have a width W of from about 2.5 mm (about 0.1 in) to about 127 mm (about 5 in), such as from about 13 mm (about 0.5 in) to about 51 mm (about 2 in). In some embodiments, the gel segments 12 shown in FIG. 2A may have a width W of about 25.4 mm (about 1 in).

The portion of the gel segments 12 that does not permeate the breathable material 18 may have a thickness $t_1$ (i.e., a dimension generally perpendicular to a surface of the breathable material 18) selected to provide cushioning properties. For example, for applications in which relatively soft cushioning elements are beneficial, the thickness $t_1$ of the gel segments 12 may be relatively large. For applications in which relatively firm cushioning elements are beneficial, the thickness $t_1$ of the gel segments 12 may be relatively smaller. In some embodiments, the thickness $t_1$ of the gel segments 12 may be from about 1.3 mm (about 0.05 in) to about 76 mm (about 3 in), or from about 2.5 mm (about 0.1 in) to about 25 mm (about 1 in). For example, the thickness $t_1$ of the gel segments 12 may be about 3.2 mm (about 0.125 in).

Dimensions of any internal gaps 16 may be selected for their effect on cushioning, breathability, mass, material cost, ease of manufacturing, etc. For example, the quadrilateral internal gaps 16 shown in FIGS. 3A through 3D may have a maximum internal dimension x of from about 1.3 mm (about 0.05 in) to about 76 mm (about 3 in), or from about 2.5 mm (about 0.1 in) to about 25 mm (about 1 in). For example, the maximum internal dimension x may be about 13 mm (about 0.5 in). The internal gaps 16 may have a secondary internal dimension y perpendicular to the maximum internal dimension x. The internal gaps 16 may have an aspect ratio defined as the ratio of the maximum internal dimension x to the secondary internal dimension y (i.e., x/y). The internal gaps 16 may have aspect ratios from about 1 to about 20, such as about 2.

As shown in FIGS. 1A and 3A, the breathable gap 14 may include a continuous network of passages, such that when a cushioned object covers substantially all the gel segments 12, there remains at least one passageway between any two points within the breathable gap 14 between gel segments 12. In other embodiments, such as shown in FIG. 2A, the cushioning element 20 may include more than one distinct breathable gap 14. Each gel segment 12 may be disposed between adjacent breathable gaps 14. In such embodiments, there may be no direct gas path between adjacent breathable gaps 14 within the cushioning element 20. However, the breathable gaps 14 may be channels through which gases may freely pass. The breathable gap 14 and/or the internal gaps 16 may allow breathing (i.e., transmission of gases) both between gel segments 12 and through each gel segment 12.

The breathable gap 14 may have a width G (i.e., a minimum dimension between adjacent gel segments 12 in a direction generally parallel to a surface of the breathable material 18) of from about 1.3 mm (0.05 in) to about 25 mm (1 in), or from about 2.5 mm (0.1 in) to about 13 mm (0.5 in). For example, the width G of the breathable gap 14 may be about 3.2 mm (0.125 in).

Gel segments 12 may have breathable gaps 14 around their entire perimeter, as shown in FIGS. 1A and 3A. However, in some embodiments, the breathable gaps 14 may be adjacent only one or two sides of the gel segments 12. For example, as shown in FIG. 2A, the gel segments 12 may be long rows of continuous gel of any of a wide variety of shapes, with breathable gaps 14 between the rows. Such a configuration may be well suited to continuous production.

In some embodiments, the cushioning elements 10, 20, or 30 may have a generally planar or otherwise cooperatively shaped top surface, broken only by the breathable gaps between and within the gel segments 12. For example, the top surfaces of each gel segment 12 may be coplanar. The cushioning elements 10, 20, or 30 may flex or bend, however, and the top surface of the cushioning elements 10, 20, or 30 (i.e., as a whole, if considered as though the gaps were filled) may be curved.

Even when not covered with a plastic film, the gel segments 12 may not break in normal use because TPE gel may be comparatively stronger than conventional materials, such as polyurethane or silicone gels. Furthermore, the gel segments 12 may be less sticky than conventional materials.

Figure 4:
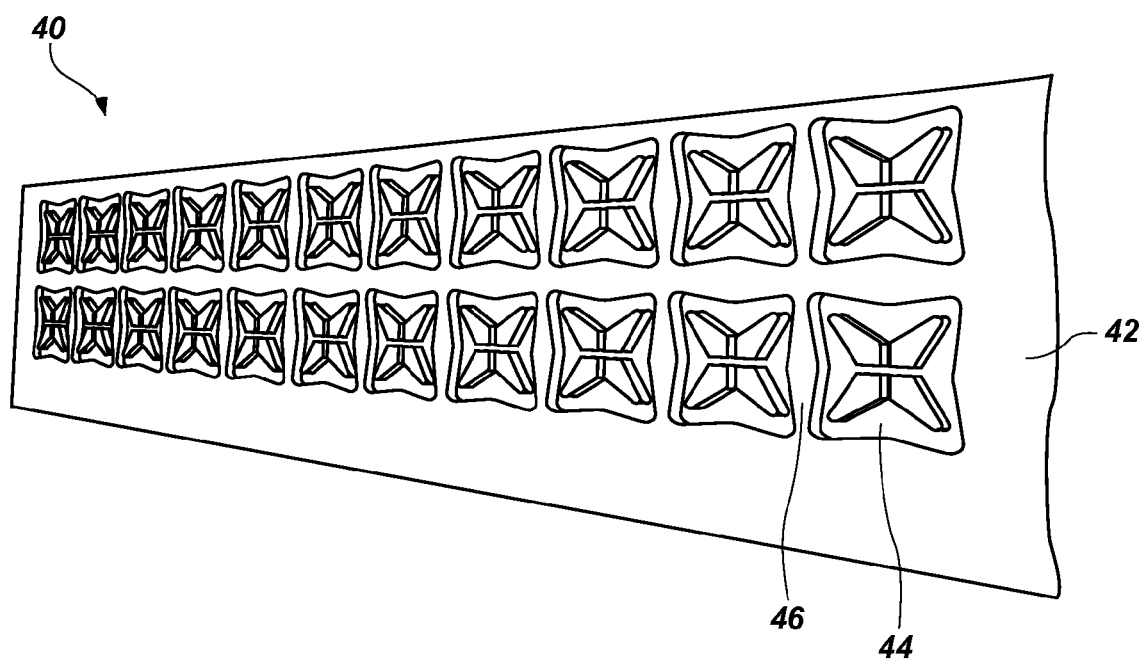
FIG. 4 is a simplified drawing of a part of a mold that may be used to make the gel segments shown in FIGS. 3A through 3D.

Methods of forming cushioning elements may include forming a plurality of discrete gel segments 12 and providing at least one breathable gap 14 between adjacent gel segments 12. Gel segments 12 may be formed by melting TPE gel and disposing the TPE gel within a mold. For example, FIG. 4 shows a mold 40 that may be used to form the gel segments 12 shown in FIG. 3A. The mold 40 includes a body 42 that defines at least one cavity 44. Walls 46 around the cavity 44 at least partially constrain molten TPE gel within the cavity 44, and may occupy a position corresponding to a position of the breathable gap 14 of the cushioning element 30. The body 42 may be, for example, a ⅛-inch-thick (3.2-mm-thick) plate of metal or plastic, with the cavities 44 machined or punched partially or completely through the body 42. The mold 40 may optionally include a backing plate (not shown) for structural support and/or to provide a surface of the cavities 44 if the cavities 44 are formed completely through the body 42.

The mold 40 may be used to shape the TPE gel in the desired final shape of the gel segments 12. For example, molten TPE gel may be poured or injected into the mold cavities 44. Pressure may be applied to the molten TPE gel to promote the flow of molten TPE gel into the cavities 44. A second mold (not shown) may include a substantially planar surface, or may include mold cavities such as the mold cavities 44 of the mold 40. Mold cavities, if any, of the second mold may similarly be filled with molten TPE gel. The mold 40 and second mold may each be placed over opposite sides of the breathable material 18. The molten TPE gel may be allowed to cool and solidify, after which the gel segments 12 formed in the cavities 44 may be removed from the mold 40.

In some embodiments, a mold 40 may be used to shape the TPE gel in the desired final shape of the gel segments 12 by providing molten TPE gel in the mold cavities 44, followed by scraping the molten TPE gel flush with the surface of the body 42 and the open top of the cavities 44. For example, the TPE gel may be poured into, pressurized onto, flooded onto, or metered into the cavities 44. The TPE gel may be scraped flush with the top of the mold 40 while still molten, or may be scraped off after cooling. For example, cooled TPE gel may be scraped with a tool (e.g., screed, putty knife, blade, etc.) that may be heated above the melt temperature of the TPE gel. In some embodiments, the amount of TPE gel disposed in each cavity 44 may be controlled to partially or precisely fully fill the cavity 44. In such embodiments, scraping may be unnecessary. A breathable material 18 may be pressed over the top of the TPE gel in each cavity 44. The TPE gel may bond to the breathable material 18 as the TPE gel solidifies.

In some embodiments, a mold 40 having cavities 44 formed completely through the body 42 may be placed atop a breathable material 18 prior to filling the cavities 44 with TPE gel. Molten TPE gel may permeate a section 18' (see FIGS. 1B, 2B, and 3D) of the breathable material 18 under the cavities 44. In other embodiments, the breathable material 18 may be placed atop the mold 40, and molten TPE gel may be poured or injected under pressure through the breathable material 18. Pressure may be applied to the molten TPE gel to promote permeation of the TPE gel into the breathable material 18 and the filling of cavities 44. The TPE gel may bond to the breathable material 18 as the TPE gel solidifies.

In some embodiments, the TPE gel may be provided in the cavities 44 in solid form. For example, TPE gel may be provided as granules or pellets, or as a continuous mass. Portions of TPE gel may be preformed to have a selected amount of gel material. For example, spheres, or "pillows," of TPE gel may be formed, each having an amount of gel material sufficient to melt and fill a single cavity 44. Individual gel spheres or pillows may be placed into cavities 44 of a heated mold 40. The heat of the mold 40 may melt the TPE gel, and the TPE gel may fill the cavities 44.

The walls 46 of the mold 40 may define the breathable gaps 14 to be formed in the cushioning elements 10, 20, 30. That is, the walls 46 provide a volume or volumes that the molten TPE gel does not occupy.

Cushioning elements 10, 20, 30 may be formed as part of a continuous-flow operation. For example, in a process of forming gel segments 12 using the mold 40 shown in FIG. 4, gel segments 12 may be formed and secured to a portion of breathable material 18. The mold 40 may be removed from the breathable material 18 and the gel segments 12. The mold 40 and/or the breathable material 18 may be moved relative to each other (e.g., the mold 40 may be indexed to another location of the breathable material 18 at which there are no gel segments 12). Additional gel segments 12 may be formed on the breathable material 18. For example, the mold 40 may include a rotating drum or a stationary drum. TPE gel may be applied to or through the breathable material 18 as the breathable material 18 rotates around with the rotating drum or passes the stationary drum. Portions of the rotating drum may be heated and/or cooled to facilitate the formation of gel segments 12.

In some embodiments, the breathable material 18 may be disposed in a roll. For example, a roll of fabric may be provided as is common in the textile industries. The fabric may be unwound from the roll, and gel segments 12 may be formed thereon (e.g., by passing the fabric continuously adjacent a rotating drum mold). After forming gel segments 12, the cushioning element 10, 20, or 30 may be wound into another roll.

In some embodiments, gel segments 12 may be separately formed, placed in a selected position, and secured over a breathable material 18. For example, gel segments 12 may be placed on a breathable material 18 by a pick-and-place apparatus, such as described in U.S. Pat. No. 7,000,966, issued Feb. 21, 2006, and entitled "Pick-and-Place Tool," the entire contents of which are incorporated herein by reference. Breathable gaps 14 may be formed by controlling the placement of the gel segments 12. The gel segments 12 may be secured to the breathable material 18 by heating the gel segments 12 and/or the breathable material 18 to a temperature near a melting point of the TPE gel. A portion of each gel segment 12 may penetrate the breathable material 18 and fuse the gel segments 12 to the breathable material 18. In some embodiments, the gel segments 12 may be secured to the breathable material 18 with an adhesive. The adhesive may temporarily or permanently bond the gel segments 12 to the breathable material 18. For example, the adhesive may bond the gel segments 12 to the breathable material 18 to maintain the position of the gel segments 12 until the gel segments 12 become permanently fused to the breathable material 18.

EXAMPLES

Example 1

A mold 40 (see FIG. 4) is formed by machining cavities 44 into a body 42, which may be a metal or polymer plate. A top plate is formed such that, when the top plate is fitted to the mold, each cavity 44 is completely encapsulated (with the exception of the gel input means, such as the runners discussed below in this Example 1).

A TPE gel is formed by mixing one part by weight SEPTON® 4055 SEEPS polymer, eight parts by weight CARNATION® White Mineral Oil (a 70-weight straight-cut white paraffinic mineral oil, available from Sonneborn, Inc., of Mahwah, N.J.), 0.25% by weight EVERNOX® 76 antioxidant (available from Everspring Chemical, of Taichung, Taiwan), 0.25% by weight EVERFOS® 168 antioxidant (available from Everspring Chemical), and 0.25% by weight HORIZON BLUE™ pigment (available from DayGlo Color Corp., of Cleveland, Ohio). The mixture is heated and extruded to melt-blend the TPE gel. The molten TPE gel is then pumped into a piston heated above a melting temperature of the TPE gel.

A cotton tricot fabric is inserted between the mold 40 (which is heated above the melt temperature of the TPE gel) and the top plate (which is cooled to below the melt temperature of the TPE gel) and the top plate is closed onto the mold 40. The heated piston is connected to a heated pipe connected to a heated sprue-and-runner system in the heated mold 40, allowing TPE gel to flow into each of the cavities 44 to form gel segments 12. The piston drives the molten TPE gel to fill the cavities 44 and permeate the fabric under pressure. The TPE gel solidifies due to the cool temperature of the top plate. The top plate is removed, and the fabric with molded TPE gel segments 12 is lifted out of the mold 40. In one embodiment, the fabric (or other breathable material 18) may be continuous. The mold 40 may then be indexed to another section of fabric to form groups of TPE gel segments 12 in successive locations. In one embodiment, the top plate is replaced by a cylindrical drum and the body 42 of the mold 40 has a radius, which matches the radius of the cylindrical drum. The molding, demolding, and indexing are performed repeatedly, and the finished cushioning element 10, 20, or 30 is wound into a roll. The cushioning element 10, 20, or 30 may then be transported to a point of use, and unrolled as necessary.

Such cushioning elements 10, 20, or 30 may have a variety of applications. For example, cushioning elements 10, 20, or 30 may be used in the manufacture of mattresses by quilting the cushioning elements 10, 20, or 30 together with a cover fabric (e.g., a mattress ticking) and optionally with other cushioning elements (e.g., foam and/or fabric), to form a top panel of a mattress. Cushioning elements 10, 20, or 30 may be used in the manufacture of seat cushions by bonding the cushioning elements 10, 20, or 30 to a foam base, then placing the assembly into a cover. Cushioning elements 10, 20, or 30 may be used in the manufacture of memory foam mattresses by adhesively bonding the cushioning elements 10, 20, or 30 to the memory foam of the mattress, then placing the assembly into a cover. Cushioning elements 10, 20, or 30 may be used in the manufacture of hot-pack muscle relaxing products and/or cold-pack pain-reducing or swelling-reducing products (e.g., in or as a cold-wrap or hot-wrap for sprained ankles or other injured body parts). In all these applications, the breathable gaps 14, the internal gaps 16 (if present), and the breathable material 18 allow air, gas, and/or vapor to pass through (i.e., the cushioning element 10, 20, or 30 is breathable).

Example 2

A mold 40 having an open face is formed as described in Example 1. Molten TPE gel is poured or pressurized into the cavities 44, and excess TPE gel is scraped off (either while still molten or after cooling). Alternatively, TPE gel may be metered into the cavities so that no scraping is necessary. A fabric, foam, or other gel-permeable breathable material 18 is laid onto the TPE gel. Light pressure may be applied to press the breathable material 18 against the TPE gel. If the TPE gel is molten during this process, some of the molten TPE gel may permeate the breathable material 18. If the TPE gel is cooled or solidified prior to placement of the breathable material 18, heat may be applied to melt at least a top portion of the TPE gel. A portion of the melted TPE gel may permeate the breathable material 18. Pressing means may also include heat, for example, a heat press (e.g., a heated plate to press onto the fabric).

Example 3

A mold 40 or a series of molds are as described in Example 2. The breathable material 18 is continuous, and the mold(s) 40 are removed from the breathable material 18 and then brought again to another part of the breathable material 18. For example, the mold(s) 40 may include a tank-tread style set of molds that are connected in a continuous circular configuration that continuously cycles under the unrolling breathable material 18, or may include a rotating drum. The mold(s) 40 may be flooded with molten TPE gel at one point on the mold rotation, followed downstream with a scraping means (e.g., a silicone rubber squeegee-type blade or a metal blade, either of which may be heated, cooled, or maintained at room temperature). The breathable material 18 is pressed into the top surface of the TPE gel while the TPE gel is still in the mold cavities. A means of pulling on the breathable material 18 translates the breathable material 18 adjacent the mold(s) 40 and provides a force to remove the gel segments 12 from the cavities 44. The gel-laden cushioning element 10, 20, or 30 thus formed may then be rolled onto a take-up roll. A continuous process may minimize the costs and increase the output of manufacturing.

Example 4

A queen-size mattress core is formed by bonding a 3-inch-thick (76-mm-thick) layer of memory foam (viscoelastic polyurethane foam) atop a 7-inch-thick (178-mm-thick) layer of standard polyurethane cushioning foam. The core has dimensions of 60 in. (152 cm) by 80 in. (203 cm) by 10 in. (25 cm). A template is machined from aluminum, having dimensions of 60 in. by 80 in. by 0.125 in. (3.2 mm), and having through holes with approximately square shapes, such as the shape of the gel segments 12 shown in FIG. 1A. The template is placed atop the memory-foam layer of the mattress core. Molten TPE gel is flooded across all the through holes, filling them. The molten TPE gel may or may not be allowed to cool. A hot blade is scraped across the top surface of the template, cutting the TPE gel on a plane coincident with the top surface of the template. The cut-off TPE gel is removed, leaving each cavity filled flush with the top surface of the template. During the flooding process, a portion of the TPE gel may seep into the porous memory foam, such as to a depth of about 0.125 in. (3.2 mm) into the foam. Thus, the total thickness of the TPE gel may be about 0.25 in. (6.4 mm)—half within and half over the foam. The template may be removed after the gel cools and solidifies, leaving gel segments 12 across the top surface of the mattress core in a similar pattern to that shown in FIG. 1A. A mattress cover may be placed over the gel segments 12 and the core. A user may experience reduced pressure peaks, reduced shear forces, and a pleasant feeling of coolness when first lying on the mattress, in contrast to a conventional memory-foam mattress. The user may eventually perspire, and the perspiration may become vapor, which may evaporate and/or move through the gaps between the gel segments 12. Thus, the mattress may limit or prevent moisture buildup, and the mattress may feel more comfortable. Furthermore, a user of such a mattress may have a smaller probability of developing decubitus ulcers than a user of a conventional mattress (which may be a desirable feature for medical mattresses for invalid patients).

Example 5

A cushioning element 10, 20, or 30 including gel segments 12 may be quilted into a mattress. A fabric is selected that is stretchable in a direction transverse to a direction of the motion through a quilting machine but non-stretchable parallel to the direction of the motion through the quilting machine. For example, cotton tricot is a natural material that may be inexpensive, permeable to molten TPE gel, and breathable. Cotton tricot is available having quiltable widths (e.g., 90 in. (2.29 m)) and one-way stretchability transverse to the rolling direction. The fabric is pulled uniformly through the quilting process without stretching (i.e., because the stretchable direction is perpendicular to the direction of pull). The stretchability in the transverse direction may allow deformation of the TPE gel or other materials in or under the quilting.

Example 6

A cushioning element 10, 20, or 30 including gel segments 12 is glued onto a mattress core in such a way as to be directly underneath a mattress cover. The cushioning element 10, 20, or 30 is positioned onto the mattress core (e.g., a foam core) so that the breathable material 18 is above the gel segments 12 (i.e., the gel segments 12 are adjacent the foam core). Placement of the gel segments 12 adjacent the foam core may allow fabric of the cover to more easily slip across the surface of the breathable material 18 so as not to bind up or cause wrinkles or other distortions in the cover. The breathable material 18 over the breathable gaps 14 and internal gaps 16 may therefore be spaced apart from the foam core, and adhesive bonding between the breathable material 18 and the mattress core may not be practical. In such a case, the breathable material 18 may extend beyond the gel segments 12 and may be secured (e.g., adhesively bonded, sewn, etc.) to the tops and/or sides of the foam core. Securing the cushioning element 10, 20, or 30 only at a perimeter of the cushioning element 10, 20, or 30 may limit the possibility of an adhesive layer interfering with the cushioning function of the mattress. Another layer of material (e.g., fabric or other relatively slippery material) may be likewise secured at least around the edges over the top of the cushioning element 10, 20, or 30 to further promote slippage of the cover.

Example 7

The breathable material 18 of a cushioning element 10, 20, or 30 including gel segments 12 is adhesively bonded to the top of a mattress core so that the gel segments are oriented up (away from the mattress core). The entire assembly (mattress core and cushioning element 10, 20, or 30) is covered with a fabric, such as a flame-retarding knitted fabric. A cover is applied over the fabric. The fabric thus applied may adhere to the gel, and may allow the cover to slip over the fabric.

Additional non-limiting example embodiments of the disclosure are described below.

Embodiment 1

A cushioning element comprising a breathable material configured to allow gases to pass through at least a portion thereof, and a plurality of discrete segments of thermoplastic elastomeric gel heat-fused to the breathable material. The thermoplastic elastomeric gel comprises an elastomeric polymer and a plasticizer. A ratio of a weight of the plasticizer to a weight of the elastomeric polymer is from about 0.3 to about 50. The plurality of discrete segments defines at least one breathable gap between adjacent discrete segments.

Embodiment 2

The cushioning element of Embodiment 1, wherein the plurality of discrete segments comprises a plurality of segments each having a generally square cross section.

Embodiment 3

The cushioning element of Embodiment 1 or Embodiment 2, wherein the plurality of discrete segments comprises a plurality of continuous segments.

Embodiment 4

The cushioning element of any of Embodiments 1 through 3, wherein at least one discrete segment of the plurality defines at least one internal gap within the segment.

Embodiment 5

The cushioning element of Embodiment 4, wherein the at least one internal gap has an aspect ratio of from about 1 to about 20.

Embodiment 6

The cushioning element of Embodiment 4 or Embodiment 5, wherein the at least one discrete segment of the plurality comprises a thermoplastic elastomeric gel material disposed between adjacent internal gaps.

Embodiment 7

The cushioning element of any of Embodiments 1 through 6, wherein a portion of each of the discrete segments permeates the breathable material.

Embodiment 8

The cushioning element of any of Embodiments 1 through 7, wherein each segment of the plurality has a thickness of less than about 25.4 mm (1.0 in).

Embodiment 9

The cushioning element of Embodiment 8, wherein each segment of the plurality has a thickness of less than about 12.7 mm (0.50 in).

Embodiment 10

The cushioning element of any of Embodiments 1 through 9, wherein the plurality of discrete segments defines a generally planar surface, broken by the at least one breathable gap between adjacent discrete segments.

Embodiment 11

The cushioning element of any of Embodiments 1 through 10, wherein the cushioning element is free of a continuous impermeable barrier.

Embodiment 12

The cushioning element of any of Embodiments 1 through 11, wherein the elastomeric polymer comprises an A-B-A triblock copolymer.

Embodiment 13

A method of forming a cushioning element comprising forming a plurality of discrete segments of thermoplastic elastomeric gel, securing each discrete segment of thermoplastic elastomeric gel to a breathable material configured to allow gases to pass through at least a portion thereof, and providing a gas path through the breathable material and between adjacent discrete segments of thermoplastic elastomeric gel. The thermoplastic elastomeric gel comprises an elastomeric polymer and a plasticizer. A ratio of a weight of the plasticizer to a weight of the elastomeric polymer is from about 0.3 to about 50.

Embodiment 14

The method of Embodiment 13, further comprising permeating the breathable material with at least a portion of each of the discrete segments of thermoplastic elastomeric gel.

Embodiment 15

The method of Embodiment 14, wherein permeating the breathable material with at least a portion of each of the discrete segments of thermoplastic elastomeric gel comprises applying pressure to the thermoplastic elastomeric gel.

Embodiment 16

The method of Embodiment 14 or Embodiment 15, wherein permeating the breathable material with at least a portion of each of the discrete segments of thermoplastic elastomeric gel comprises permeating a fabric with at least a portion of the discrete segments of thermoplastic elastomeric gel.

Embodiment 17

The method of any of Embodiments 13 through 16, wherein forming a plurality of discrete segments of thermoplastic elastomeric gel comprises providing molten thermoplastic elastomeric gel within a mold, and solidifying the molten thermoplastic elastomeric gel.

Embodiment 18

The method of Embodiment 17, further comprising moving at least one of the mold and the breathable material such that the mold is adjacent a portion of the breathable material substantially free of the thermoplastic elastomeric gel.

Embodiment 19

The method of any of Embodiments 13 through 18, further comprising securing at least a portion of the breathable material to another cushioning element.

Embodiment 20

The method of any of Embodiments 13 through 19, wherein forming the plurality of discrete segments of thermoplastic elastomeric gel comprises continuously forming the plurality of discrete segments of thermoplastic elastomeric gel on a roll of the breathable material.

Embodiment 21

The method of any of Embodiments 13 through 20, wherein forming a plurality of discrete segments of thermoplastic elastomeric gel comprises selecting the elastomeric polymer to comprise an A-B-A triblock copolymer.

Embodiment 22

The method of any of Embodiments 13 through 21, further comprising quilting at least a portion of the breathable material to a cover.

Embodiment 23

A method of forming a cushioning element comprising disposing a permeable material adjacent a mold, providing at least a first portion of a molten thermoplastic elastomeric gel within the mold, providing at least a second portion of the molten thermoplastic elastomeric gel within the permeable material, solidifying the molten thermoplastic elastomeric gel to form discrete segments of thermoplastic elastomeric gel, and separating the mold from at least a portion of the permeable material. The thermoplastic elastomeric gel comprises an elastomeric polymer and a plasticizer. A ratio of a weight of the plasticizer to a weight of the elastomeric polymer is from about 0.3 to about 50.

Embodiment 24

The method of Embodiment 23, wherein disposing the permeable material adjacent the mold and separating the mold from at least a portion of the permeable material each comprises translating the permeable material adjacent a rotating drum.

Embodiment 25

The method of Embodiment 23, further comprising unwinding the permeable material from a first roll and winding the permeable material having discrete segments of thermoplastic elastomeric gel to form a second roll.

Embodiment 26

The method of any of Embodiments 23 through 25, wherein providing at least a first portion of a molten thermoplastic elastomeric gel within the mold comprises selecting the elastomeric polymer to comprise an A-B-A triblock copolymer.

Embodiment 27

A cushioning element comprising a breathable material configured to allow gases to pass through at least a portion thereof and a plurality of discrete segments of thermoplastic elastomeric gel attached to the breathable material. The plurality of discrete segments is heat-fused to the breathable material. The plurality of discrete segments and the breathable material together define at least a portion of at least one void. The thermoplastic elastomeric gel comprises an elastomeric polymer and a plasticizer, and a ratio of a weight of the plasticizer to a weight of the elastomeric polymer is from about 0.3 to about 50.

Embodiment 28

The cushioning element of Embodiment 27, wherein the breathable material comprises a material selected from the group consisting of a woven fabric, a knit fabric, a mesh fabric, a spacer fabric, a fabric laminated to a vapor-transmissible film, and a porous foam having an open-pore network.

Embodiment 29

The cushioning element of Embodiment 27 or Embodiment 28, wherein the elastomeric polymer comprises an A-B-A triblock copolymer.

Embodiments of the disclosure may be susceptible to various modifications and alternative forms. Specific embodiments have been shown in the drawings and described in detail herein to provide illustrative examples of embodiments of the disclosure. However, the disclosure is not limited to the particular forms disclosed herein. Rather, embodiments of the disclosure may include all modifications, equivalents, and alternatives falling within the scope of the disclosure as broadly defined herein. Furthermore, elements and features described herein in relation to some embodiments may be implemented in other embodiments of the disclosure, and may be combined with elements and features described herein in relation to other embodiments to provide yet further embodiments of the disclosure.

What is claimed is:

1. A cushioning element, comprising:
   an element for temperature management and cushioning, comprising:
   a breathable material defining a plurality of voids that allows gases to pass continuously through the breathable material in a direction parallel to a major surface of the breathable material and in a direction perpendicular to the major surface of the breathable material; and
   a plurality of discrete segments of thermoplastic elastomeric gel disposed over and heat-fused to the major surface of the breathable material, wherein a portion of the thermoplastic elastomer gel is disposed within some of the voids, wherein each segment has a thickness in a direction perpendicular to a surface of the breathable material, wherein each segment has a center surrounded by a perimeter containing a plurality of cross dimensions parallel to the surface of the breathable material, wherein all of the plurality of cross dimensions of the segment in a direction parallel to the surface are larger than the thickness, and wherein the plurality of discrete segments allows gases to pass continuously over the breathable material and between the discrete segments in a direction perpendicular to the major surface of the breathable material, the thermoplastic elastomeric gel comprising an elastomeric polymer and a plasticizer;

wherein at least one discrete segment of the plurality defines a plurality of breathable internal gaps within the segment arranged around the center of the segment comprising a thermoplastic elastomeric gel material disposed between adjacent internal gaps, each of the plurality of internal gaps having an aspect ratio from 1 to 20, the aspect ratio defined as a ratio of x/y, wherein x is defined as a maximum internal dimension perpendicular to the thickness of the segment and having a midpoint and y is defined as a second largest internal dimension perpendicular to the maximum internal dimension and the thickness of the segment, the second largest dimension occurring before the midpoint of the largest dimension;

wherein a ratio of a weight of the plasticizer to a weight of the elastomeric polymer is from about 0.3 to about 50;

wherein the plurality of discrete segments defines breathable gaps between adjacent discrete segments.

2. The cushioning element of claim 1, wherein the plurality of discrete segments comprises a plurality of segments each having a generally square perimeter.

3. The cushioning element of claim 1, wherein the thickness of each segment is less than 25.4 mm (1.0 in).

4. The cushioning element of claim 3, wherein the thickness of each segment is less than 12.7 mm (0.50 in).

5. The cushioning element of claim 1, wherein the breathable gaps each have a width from about 1.3 mm (0.05 in) to about 25 mm (1 in).

6. The cushioning element of claim 5, wherein of each of the breathable gaps have a width from about 2.5 (0.1 in) to about 13 mm (0.5 in).

7. The cushioning element of claim 5, wherein one of the plurality of cross dimensions is a width, wherein the width of each segment of the plurality of from about 2.5 mm (0.1 in) to about 127 mm (5 in).

8. The cushioning element of claim 7, the width of each segment of the plurality is from about 13 mm (0.5 in) to about 51 mm (2 in).

9. The cushioning element of claim 8, the width of each segment of the plurality is about 25.4 mm (1.0 in).

10. The cushioning element of claim 1, wherein the plurality of discrete segments defines a generally planar surface, broken by the breathable gaps between adjacent discrete segments.

11. The cushioning element of claim 1, wherein the cushioning element is free of a continuous impermeable barrier.

12. The cushioning element of claim 1, wherein the elastomeric polymer comprises an A-B-A triblock copolymer.

13. The cushioning element of claim 1, wherein the breathable material comprises a material selected from the group consisting of a woven fabric, a knit fabric, a mesh fabric, a spacer fabric, a fabric laminated to a vapor-transmissible film, and a porous foam having an open-pore network.

14. The cushioning element of claim 1, wherein the element for temperature management and cushioning comprises a quilted top panel of a mattress.

15. The cushioning element of claim 1, wherein the element for temperature management and cushioning is adhesively bonded to a foam base.

16. The cushioning element of claim 15, further comprising a cover surrounding the foam base and the element for temperature management and cushioning.

17. The cushioning element of claim 1, wherein the breathable material comprises memory foam.

* * * * *

UNITED STATES PATENT AND TRADEMARK OFFICE
CERTIFICATE OF CORRECTION

PATENT NO. : 9,603,461 B2
APPLICATION NO. : 13/420999
DATED : March 28, 2017
INVENTOR(S) : Tony M. Pearce, Russell Whatcott and LaVon Lee Bennett It is certified that error appears in the above-identified patent and that said Letters Patent is hereby corrected as shown below:

On the Title Page

In ITEM (75) Inventors:   Line 2,   change "Russel Whatcott," to --Russell Whatcott,--

In the Specification

Column 3,   Line 15,   change "between the TOWS;" to --between the rows;--

Column 5,   Line 33,   change "element 10, 20, via" to --element 10, 20, 30 via--

In the Claims

Claim 7,   Column 20,   Line 2,   change "a width, wherein the width" to --a width--

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*